United States Patent [19]

Waddill

[11] 4,127,514

[45] Nov. 28, 1978

[54] PROCESS FOR ACCELERATED CURE OF EPOXY RESINS

[75] Inventor: Harold G. Waddill, Austin, Tex.

[73] Assignee: Texaco Development Corporation, New York, N.Y.

[21] Appl. No.: 854,173

[22] Filed: Nov. 23, 1977

[51] Int. Cl.$^2$ .......................................... C08G 59/56
[52] U.S. Cl. ...................... 528/93; 252/426; 528/88; 528/111; 528/403; 528/408
[58] Field of Search .............. 260/2 EC, 2 N, 47 EC, 260/47 EN, 59 EP; 252/426

[56] References Cited

U.S. PATENT DOCUMENTS

| | | | |
|---|---|---|---|
| 2,703,765 | 3/1955 | Osdal | 117/75 |
| 3,409,590 | 11/1968 | Landua et al. | 260/47 |
| 3,462,393 | 8/1969 | Legler | 260/47 |
| 3,486,925 | 12/1969 | Hoffman | 117/76 |
| 3,575,870 | 4/1971 | Shimoyama | 252/182 |
| 3,595,833 | 7/1971 | Stolton | 260/47 |
| 3,639,928 | 2/1972 | Bentley et al. | 260/47 EC |
| 3,740,373 | 6/1973 | Bentley et al. | 260/47 EC |
| 3,793,271 | 2/1974 | Godfrey et al. | 260/18 PN |

Primary Examiner—Harold D. Anderson
Assistant Examiner—E. A. Nielsen
Attorney, Agent, or Firm—Carl G. Ries; Thomas H. Whaley; Kenneth R. Priem

[57] ABSTRACT

A process for the accelerated cure of an epoxy resin is disclosed. The resulting epoxy resin may be used in protective coatings, adhesives, seamless and terrazo flooring and caulking and sealing compositions. The resulting resin is also useful, for example, in casting, potting, in escapulating, grouting and patching. The process involves mixing an epoxy resin of the polyhydric phenol, polyglycidyl ether type by mixing with an accelerator-hardener combination made up of (a) a liquid mixture of salicyclic acid and either iminobis(propylamine) or methyliminobis(propylamine) and (b) a polyoxyalkylenepolyamine and allowing the mixture to cure at ambient or elevated temperatures.

20 Claims, No Drawings

PROCESS FOR ACCELERATED CURE OF EPOXY RESINS

BACKGROUND OF THE INVENTION

The present invention relates to the field of curing epoxy resins.

Polyoxypropylenepolyamines react with epoxy resins at a rate which is unsatisfactorily slow for certain applications. In order to provide a rate of cure which is satisfactory for most uses an accelerator must be used with the polyoxypropylenepolyamines in order to speed the rate of cure.

Lee, Henry and Neville, Kris, Handbook of Epoxy Resins, McGraw-Hill Book Co., N.Y., 1967 p. 7-14, describes the use of N-(2-aminoethyl)piperazine as an epoxy curing agent and at page 11-18 describes the use of salicylic acid as an accelerator for urea-formaldehyde epoxy resin coatings. Bobby Leger's U.S. Pat. No. 3,462,393 (Aug. 18, 1969) teaches the use of polyoxyalkylenepolyamines as curing agents for a polyglycidyl ether of a phenolic compound.

U.S. Pat. No. 3,639,928 claims the use of a combination of N-(3-aminopropyl)piperazine and salicylic acid as an accelerator combination with polyoxyalkylenepolyamine for curing epoxy resins.

SUMMARY OF THE INVENTION

The invention is a process for the accelerated cure of an epoxy resin composition of the polyhydric phenol, polyglycidyl ether type. The process involves mixing the epoxy resins with a synergistic accelerator-hardener combination comprising (a) (accelerator) a liquid mixture of salicylic acid and either iminobis(propylamine) and/or methyliminobis(propylamine) and (b) (hardening agent) an amine curing agent i.e., a polyoxyalkylenepolyamine and allowing the mixture to cure at ambient or elevated temperatures. The invention is also the accelerator combination of (a) and the resulting cured epoxy resin.

DESCRIPTION OF THE PREFERRED EMBODIMENTS

The epoxy resin used herein can be any of the well known epoxy resins having an epoxy equivalency of more than one, for example, the polyglycidyl ether of polyhydric phenol. As is well known in the art, these resins may be prepared by condensing epichlorohydrin with a polyhydric alcohol or phenol, for example, ethylene glycol, diethylene glycol, glycerol, diglycerol, catechol, resorcinol, a trihydroxybenzene, a di(hydroxyphenyl) methane, a di(hydroxyphenyl) ethane, a di(hydroxyphenyl) propane, etc. A preferred type of polyepoxide used in the first epoxy resin layer, i.e., the adhesive barrier coat is that derived from condensing epichlorohydrin with 2,2-bis (p-hydroxyphenyl) propane, known generally as bisphenol-A, containing cresyl glycidyl ether as a reactive diluent and having an epoxide equivalent weight of from 175 to 195.

Preferred examples of the polyoxyalkylenepolyamine include compounds of the following formulae:

$$H_2NCH(CH_3)CH_2[OCH_2CH(CH_3)]_xNH_2 \quad (I)$$

where $x = 2$ to 40 and

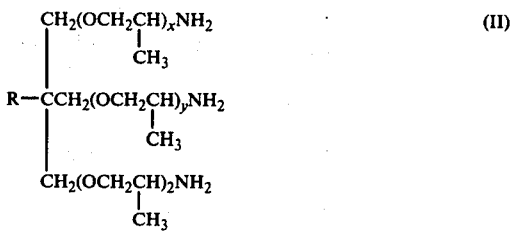

where $x + y + z = 3$ to 40 and

where $x + z = 2$ to 10 and $y = 1$ to 50

The invention also encompasses using amine curing agents other than the polyoxyalkylenepolyamines above. For example, ethylene amines, of which diethylenetriamine and triethylenetetramine are examples, amidopolyamines produced from the reaction of carboxylic acids with aliphatic polyamines and aromatic amines such as 4,4'-methylenedianiline.

An accelerator mixture comprises salicylic acid and either iminobis(propylamine) or methyliminobis(propylamine).

Thus, the invention involves for basic components to be mixed:

(A) Epoxy resin
(B) an amine curing agent
(C) iminobis(propylamine) and/or methyliminobis(propylamine)
(D) salicylic acid The order of mixing is not critical to the practice of our invention. For example, components B, C and D, supra, can be blended in any desired order to give a homogeneous accelerated curing agent, which is then mixed with component A at the time of use.

A more convenient method of practicing this invention is to mix component C and component D. This combination is a clear, stable liquid free of crystals or solids which can be stored for an indefinite period of time, if desired. The combination of components C and D may then be blended with component B prior to mixing with component A.

The weight ratio of component C to component D may vary from 10/1 to 1/1, preferably from 8/1 to 2/1. The combined weight of components C and D present when mixed with component B may range from five parts by weight per 100 parts of B to 30 parts per 100 parts of B. The optimum amount for a given application may vary by some percent and is simply within the skill of the art to determine the desired variation for the most effective amount.

For curing epoxy resins, the hardening agent is usually added in an amount such that there is one reactive —NH group in the hardener component for each epoxy group in the epoxy resin component. These are known as stoichiometric quantities. The stoichiometric quantity can be calculated from a knowledge of the chemical structure and analytical data on the components.

For the purposes of this invention, the stoichiometric amount of the accelerated hardener is calculated by adding together the number of equivalents (on the basis of weight per replaceable NH group) in components B and C. In general it is advantageous to use up to 10 percent excess of the accelerated hardener over the stoichiometric amount.

The curing temperature range of the ambient temperatures are from about 0° to about 45° C. Post cures at temperatures up to about 200° C. are optional. The cured epoxy resins of the invention are useful in castings, coatings, adhesives, laminates, filament-reinforced composites, seamless flooring, terrazzo flooring, crushed-stone aggregates and in grouting, caulking and sealing compositions.

The following examples show the synergistic effect of the combination of salicylic acid and iminobispropylamine on the rate of cure of an epoxy resin by a polyoxypropylenepolyamine.

In the following examples, the epoxy resin used is a diglycidyl ether of isopropylidenediphenol having an equivalent weight per epoxide group of about 190. JEFFAMINE ® D-400 is a polyoxypropylenediamine of formula I having an equivalent weight per hydrogen of 105.

| Example No. | Epoxy Resin gm. | JEFFAMINE ® D-400, gm. | gm. IBPA* | Salicylic Acid, g. | Gel time, mins. |
|---|---|---|---|---|---|
| 1 | 100 | 55 | — | — | >300 |
| 2 | 100 | 40 | 10 | — | 115.7 |
| 3 | 100 | 55 | — | 2.0 | >160 |
| 4 | 100 | 40 | 8 | 2.0 | 41.7 |

*iminobispropylamine

Drying times for the above experiments were as follows:

| Experiment No. | Set to touch time, hrs. | Through-dry time, hrs. |
|---|---|---|
| 1 | 19.3 | 25.3 |
| 2 | 12.9 | 21.1 |
| 3 | 14.8 | 21.0 |
| 4 | 10.9 | 13.8 |

I claim:

1. A process for accelerating the cure of an epoxy resin cured with a polyoxyalkylenepolyamine which comprises:
    incorporating therein an accelerator combination of salicylic acid and iminobis(propylamine).
2. A process as in claim 1 wherein the weight ratio of iminobis(propylamine) to salicylic acid ranges from about 10/1 to 1/1.
3. A process as in claim 1 wherein the combined weight of the iminobis(propylamine) and salicylic acid ranges from about five parts by weight per 100 parts of the polyoxyalkylenepolyamine to about 30 parts by weight of the polyoxyalkylenepolyamine.
4. A process as in claim 1 wherein the curing temperature ranges from about 0° C. to about 45° C.
5. A process as in claim 1 wherein the polyoxyalkylenepolyamine is a polyoxypropylenepolyamine.
6. A process as in claim 5 wherein the polyoxypropylenepolyamine is a polyoxypropylenediamine.
7. A process as in claim 6 wherein the polyoxypropylenediamine has an equivalent weight per hydrogen of about 105.
8. A process for accelerating the cure of an epoxy resin cured with a polyoxyalkylenepolyamine which comprises:
    incorporating therein an accelerator combination of salicylic acid and methyliminobispropylamine.
9. A process as in claim 8 wherein the weight ratio of methyliminobis(propylamine) to salicylic acid ranges from about 10/1 to 1/1.
10. A process as in claim 8 wherein the combined weight of the methyliminobis(propylamine) and salicylic acid ranges from about five parts by weight per 100 parts of the polyoxyalkylenepolyamine to about 30 parts by weight of the polyoxyalkylenepolyamine.
11. A process as in claim 8 wherein the curing temperature ranges from about 0° C. to about 45° C.
12. A process as in claim 8 wherein the polyoxyalkylenepolyamine is a polyoxypropylenepolyamine.
13. A process as in claim 12 wherein the polyoxypropylenepolyamine is a polyoxypropylenediamine.
14. A process as in claim 13 wherein the polyoxypropylenediamine has an equivalent weight per hydrogen of about 105.
15. An accelerator combination for curing epoxy resin comprising
    salicylic acid and iminobis(propylamine).
16. An accelerator combination of claim 15 wherein the weight ratio of iminobis(propylamine) to salicylic acid ranges from about 10/1 to 1/1.
17. An accelerator combination for curing epoxy resins comprising
    salicylic acid and methyliminobis(propylamine).
18. An accelerator combination of claim 17 wherein the weight ratio of methyliminobis(propylamine) to salicylic acid ranges from about 10/1 to 1/1.
19. A cured epoxy resin composition made by combining an epoxy resin, a polyoxyalkylenepolyamine, salicylic acid and iminobis(propylamine).
20. A cured epoxy resin composition made by combining an epoxy resin, a polyoxyalkylenepolyamine, salicylic acid and methyliminobis(propylamine).

* * * * *